(12) United States Patent
Von Schoening

(10) Patent No.: US 10,386,534 B2
(45) Date of Patent: Aug. 20, 2019

(54) METHOD AND DEVICE FOR INSPECTING A VALVE DRIVE IN AN INTERNAL COMBUSTION ENGINE

(71) Applicant: Bayerische Motoren Werke Aktiengesellschaft, Munich (DE)

(72) Inventor: Sebastian Von Schoening, Berlin (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/288,456

(22) Filed: Oct. 7, 2016

(65) Prior Publication Data
US 2017/0023699 A1  Jan. 26, 2017

Related U.S. Application Data

(63) Continuation of application No. PCT/EP2015/053777, filed on Feb. 24, 2015.

(30) Foreign Application Priority Data

Apr. 11, 2014 (DE) .................... 10 2014 207 016

(51) Int. Cl.
*G01V 8/20* (2006.01)
*F01L 1/344* (2006.01)
(Continued)

(52) U.S. Cl.
CPC ............ *G01V 8/20* (2013.01); *F01L 1/344* (2013.01); *F01L 1/46* (2013.01); *F01L 13/0015* (2013.01);
(Continued)

(58) Field of Classification Search
CPC ......... F01L 1/46; F01L 13/0015; F01L 1/344; F01L 2800/02; F01L 2800/14;
(Continued)

(56) References Cited

U.S. PATENT DOCUMENTS 5,113,693 A    5/1992 Hata
8,045,183 B2 * 10/2011 Klemmer ........... B23Q 17/2404
                                              356/614
(Continued)

FOREIGN PATENT DOCUMENTS

CN    101243305 A    8/2008
DE    40 28 969 A1   4/1991
(Continued)

OTHER PUBLICATIONS

International Search Report (PCT/ISA/210) issued in PCT Application No. PCT/EP2015/053777 dated Apr. 23, 2015, with English translation (six (6) pages).
(Continued)

*Primary Examiner* — Tri T Ton
(74) *Attorney, Agent, or Firm* — Crowell & Moring LLP

(57) ABSTRACT

A method for ascertaining a valve position of a valve of an internal combustion engine having a multiplicity of valves. The method includes illuminating a combustion chamber of the internal combustion engine, detecting light emerging from the illuminated combustion chamber on a side, averted from the combustion chamber, of the valve for ascertainment, and determining the valve position of the valve for ascertainment by way of the detected light.

15 Claims, 2 Drawing Sheets

(51) Int. Cl.
  *F01L 1/46* (2006.01)
  *F01L 13/00* (2006.01)
(52) U.S. Cl.
  CPC ....... *F01L 2800/02* (2013.01); *F01L 2800/14* (2013.01); *F01L 2800/18* (2013.01)
(58) Field of Classification Search
  CPC ........ F01L 2800/18; G01V 8/20; G06F 3/167; G08B 13/19669; G10L 2015/223; H04N 21/2743; H04N 21/422; H04N 21/42202; H04N 21/42203
  See application file for complete search history.

(56) References Cited

U.S. PATENT DOCUMENTS

| | | |
|---|---|---|
| 2007/0017461 A1 | 1/2007 | Jesel et al. |
| 2009/0123032 A1 | 5/2009 | Kanisawa et al. |
| 2009/0141289 A1 | 6/2009 | Klemmer et al. |
| 2014/0324324 A1* | 10/2014 | Martin ............. F02P 23/04 701/113 |

FOREIGN PATENT DOCUMENTS

| | | |
|---|---|---|
| DE | 100 18 060 A1 | 10/2001 |
| DE | 201 16 202 U1 | 1/2002 |
| DE | 10 2005 004 248 A1 | 8/2006 |
| EP | 2 192 381 A1 | 6/2010 |
| JP | 2000-42870 A | 2/2000 |
| JP | 2000-130122 A | 5/2000 |
| JP | 2009-197606 A | 9/2009 |

OTHER PUBLICATIONS

German Search Report issued in counterpart German Application No. 10 2014 207 016.3 dated Oct. 24, 2014, with partial English translation (fifteen (15) pages).

Chinese-language Office Action issued in counterpart Chinese Application No. 201580003129.0 dated Nov. 30, 2017 with English translation (14 pages).

* cited by examiner

METHOD AND DEVICE FOR INSPECTING A VALVE DRIVE IN AN INTERNAL COMBUSTION ENGINE

CROSS REFERENCE TO RELATED APPLICATIONS

This application is a continuation of PCT International Application No. PCT/EP2015/053777, filed Feb. 24, 2015, which claims priority under 35 U.S.C. § 119 from German Patent Application No. 10 2014 207 016.3, filed Apr. 11, 2014, the entire disclosures of which are herein expressly incorporated by reference.

BACKGROUND AND SUMMARY OF THE INVENTION

The embodiments of the invention relate to a method for inspecting a valve drive, in particular for ascertaining a valve position of a valve of an internal combustion engine, and to a corresponding device.

During the production of internal combustion engines, it is necessary for the assembled engine (entire engine) to be subjected to a function test in order to inspect a valve drive, in particular the opening and closing times of the inlet and outlet valves, and measure the control timing. Here, the internal combustion engine is subjected, for example, to the so-called "cold test", in which the internal combustion engine is driven by way of a cranking drive. Alternatively, control timing measurement devices are known which operate by way of tactile measurement.

Both measurement methods necessitate the use of corresponding devices. These are however normally very large and expensive and require regular calibration. In particular in the case of very narrow cylinder heads, the use of the control timing measurement device is possible only with difficulty owing to the tactile measurement on the entire engine.

DE 10 2005 004 248 A1 has therefore disclosed an optical measurement method for the ascertainment, on an internal combustion engine, of the valve drive or of the position of a valve, by virtue of light being supplied to the respective valve from a side pointing toward the valve shank. In the combustion chamber there is arranged a light-sensitive measurement element which is capable of detecting a passage of light from the combustion chamber upon opening of the valves and an obstruction of light upon closing of the valves.

Said optical method has the characteristic that, in the case of an internal combustion engine having multiple valves per combustion chamber, only the opening of the first valve can be detected. As soon as the first valve is opened, light passes via the opened valve into the combustion chamber and is detected there. If a second valve opens while the first valve is still open, then it is the case that, in addition to the light entering via the first valve, light also passes into the already illuminated combustion chamber via the second valve. The measurement element arranged there thus cannot detect a change. Consequently, the method permits only the detection of the first entry of light after the opening of the first valve, such that an opening time of the second valve therefore cannot be determined.

It is thus an object of the embodiments of the invention to make it possible for opening and closing times of individual valves to be detectable independently of one another.

Said object is achieved by way of the method as per claim 1 or 2, and by way of a device having the features of patent claim 7.

Advantageous embodiments emerge from the respectively dependent patent claims.

Accordingly, a method for ascertaining a valve position of a valve of an internal combustion engine having a multiplicity of valves is provided, having the following steps:
illuminating a combustion chamber of the internal combustion engine,
detecting light emerging from the illuminated combustion chamber on a side, averted from the combustion chamber, of the valve for ascertainment,
determining the valve position of the valve for ascertainment by way of the detected light.

The method is preferably utilized for ascertaining a respective valve position of at least two valves of an internal combustion engine having a multiplicity of valves, giving rise to the following steps:
illuminating a combustion chamber of the internal combustion engine,
detecting light emerging from the illuminated combustion chamber on a side, in each case averted from the combustion chamber, of the valves for ascertainment,
determining the respective valve position of the at least two valves for ascertainment on the basis of the light detected in each case.

In each case, therefore, the combustion chamber of the internal combustion engine is illuminated by way of a light source. For as long as the valve for ascertainment is closed, no light passes out of the combustion chamber through the valve. The closed position of the valve can thus be uniquely identified. As soon as the valve then opens, light passes out of the combustion chamber and can be detected on that side of the valve which is averted from the combustion chamber. This makes it possible for the present position of the valve to be determined in a particularly precise manner.

Here, a position of the other valves has no influence, such that the positions of more than one valve can also be determined independently of one another. In each case, light emerging from the combustion chamber is detected on the valve side averted from the combustion temperature in each case only when the associated valve is actually open. The position of the one or more other valves therefore does not influence the measurement, such that, for the individual determination of the respective valve position, it makes no difference whether the other valves are open or closed. In summary, the method according to the embodiments of the invention makes it possible for each valve position to be determined separately.

Furthermore, the step of detecting the emerging light may be performed continuously or discontinuously. This means that the detection of the light includes a continuous measurement of a light intensity, and thus any change can be immediately converted into a corresponding signal for a suitable further processing. In the case of a discontinuous detection, a measurement is performed only at defined points in time or at defined time intervals.

The step of detecting the emerging light thus preferably includes a detection of the change in light intensity and/or of a (complete) obstruction of the light emerging from the combustion chamber. The obstruction of the detected light unequivocally indicates that the valve is situated in the closed position, and a sealing action is realized.

The measurement of the light intensity may be utilized to make a distinction between the closed position and the open position. In addition, a distinction may be made between intermediate values for the values of the light intensity arising between the closed position and the open position, in order thereby to ascertain one or more intermediate positions of the valve.

In one embodiment, each valve is assigned a respective light sensor, and the method furthermore includes a step of assigning the light detected by way of the at least one light sensor to the respective valve assigned to the light sensor.

This makes it possible to uniquely ascertain an individual position of each of the valves for measurement. This is realized in that the light from the combustion chamber can pass to the respective light sensor only when the associated valve is actually open. An influence arising from an opening or closing of another valve is thus prevented in an effective manner at all times.

Furthermore, the method may also include a step of detecting a crank angle of a crankshaft of the internal combustion engine.

The information regarding the crank angle may be used to assign the detected valve position to the associated rotational position of the engine.

For the implementation of the method, the internal combustion engine may furthermore be driven with cranking action by way of a separate drive. This may for example be performed before or during the so-called cold test.

By way of the described method, it is thus possible, given a known cam lift curve, for the control timing and a valve play to be tested on a valve-specific basis on the assembled entire engine.

Also described is a device for ascertaining a valve position of at least one valve of an internal combustion engine, having a combustion chamber of the internal combustion engine, and having a light source and at least one light sensor for detecting the light of the light source, characterized in that the light source is designed to illuminate the combustion chamber, and the at least one light sensor is designed to detect the light emerging from the illuminated combustion chamber on a side, averted from the combustion chamber, of the at least one valve.

For example, the light source includes an illuminant, in particular an incandescent lamp, an LED illuminant or a laser. The light source is for example installed in place of the spark plug or glow plug in order to illuminate the interior of the combustion chamber.

The at least one light sensor is preferably arranged on that side of the at least one valve which is averted from the combustion chamber, in particular in an inlet or outlet duct assigned to the at least one valve.

This means that the light sensor either may be arranged within the inlet or outlet ducts, or is arranged such that said light sensor can at least detect the light intensity within the inlet or outlet duct. For example, the light sensor may issue into the respective duct for this purpose.

Alternatively, the arrangement includes a multiplicity of light sensors, wherein each light sensor is assigned to a respective arm of a split inlet or outlet duct.

Furthermore, the arrangement can include a cranking drive for driving the internal combustion engine with cranking action.

Other objects, advantages and novel features of the embodiments of the present invention will become apparent from the following detailed description of one or more preferred embodiments when considered in conjunction with the accompanying drawings, in which:

DETAILED DESCRIPTION OF THE DRAWINGS

Figure 1:
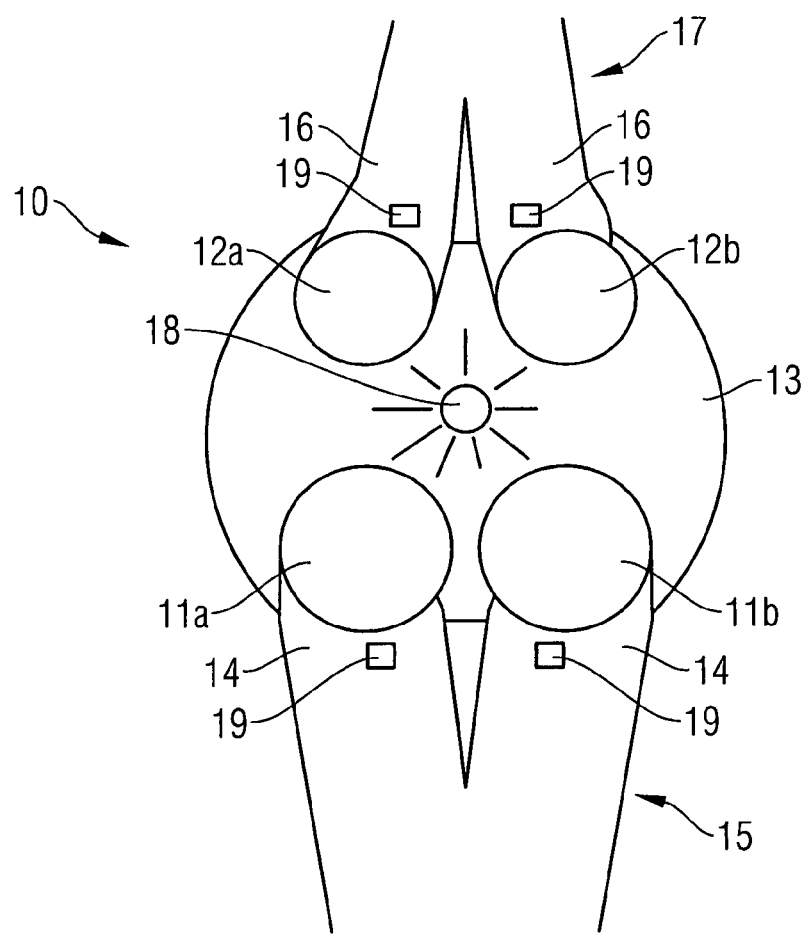
FIG. 1 is a schematic partial plan view of a device.

FIG. 1 shows a schematic plan view of a device 10 (only partially illustrated) for carrying out a function test of an assembled internal combustion engine having one or more cylinders (only one cylinder is indicated), in particular for ascertaining a valve position of the valves 11a,b, 12a,b of the internal combustion engine. Said internal combustion engine has a combustion chamber 13 into which two branched arms 14 of an inlet duct 15 issue via a respective one of the inlet valves 11a,b. Two arms 16 of the outlet duct 17 lead out of the combustion chamber 13 via the two outlet valves 12a,b, and, during the further progression thereof, merge to form the common outlet duct 17. Within the combustion chamber 13 there is arranged a light source 18 for illuminating the combustion chamber 13.

Furthermore, four light sensors 19 for detecting the light of the light source 18 are provided, which light sensors are assigned to in each case one of the four valves 11a,b, 12a,b and are designed to detect the light emerging from the illuminated combustion chamber 13 on a side, averted from the combustion chamber 13, of the respective valve 11a,b, 12a,b.

For this purpose, the light sensors 19 are arranged on that side of the respective valve 11a,b, 12a,b which is averted from the combustion chamber 13. In the embodiment illustrated, each light sensor 19 is arranged in each case one respective arm 14, 16 of the split inlet duct 15 and outlet duct 17 respectively, which are assigned to the associated valve 11a,b, 12a,b. The arms 14, 16 are optically separated from one another by their wall, such that light entering one of the arms 14, 16 from the combustion chamber 13 is not detected by the light sensor 19 of the adjacent arm 14, 16 of the inlet 15 or outlet duct 17. In this way, separate, valve-specific detection of the light emerging from the combustion chamber 13 is possible, whereby a valve-specific valve position can be determined.

Figure 2:
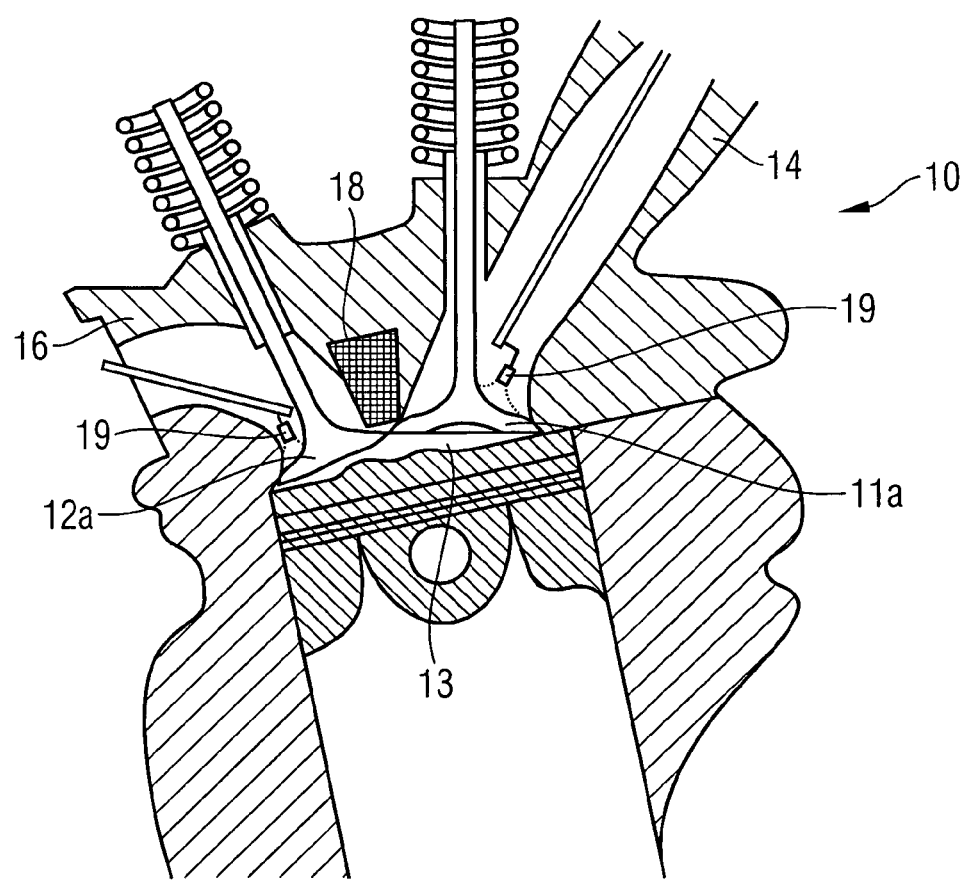
FIG. 2 is a sectional, partial side view of the device.

FIG. 2 shows the device 10 in a sectional side view, with one arm 14 of the split inlet duct 15 and one arm 16 of the split outlet duct 17. Each arm 14, 16 is assigned in each case one valve 11a, 12a, which is movable at least between an open position and a closed position.

On that side of the valves 11a, 12a which is averted from the combustion chamber 13 in each case (that is to say at the rear side of said valve), there is arranged in each case one light sensor 19. The arrangement of the light sensors 19 in FIG. 2 is to be regarded as being merely schematic. The light sensors 19 should at least be arranged such that the light sensors 19 can detect the light emerging from the combustion chamber 13. For example, the light sensors 19 may, for this purpose, be arranged within the inlet duct 15 or the outlet duct 17. Likewise, the light sensors 19 may be arranged in a wall of the ducts 15, 17 and may be directed into the respective duct 15, 17.

In the preferred embodiment illustrated, the light source 18 (merely schematically indicated) may for example be inserted, in place of a spark plug, into the receptacle thereof, such that comprehensive modification of the engine can be avoided. It is self-evidently also possible for other suitable receptacles to be provided instead. It is also possible for one of the valves 11a,b, 12a,b to be removed, and for a light source for illuminating the combustion chamber 13 to be provided in place thereof.

The foregoing disclosure has been set forth merely to illustrate the embodiments of the invention and is not intended to be limiting. Since modifications of the disclosed embodiments incorporating the spirit and substance of the embodiments of the invention may occur to persons having ordinary skill in the art, the embodiments of the invention should be construed to include everything within the scope of the appended claims and equivalents thereof.

What is claimed is:

1. A method for ascertaining a valve position of a valve of an internal combustion engine having a multiplicity of valves, each valve having a head and a stem, the method comprising the acts of:
    illuminating a combustion chamber of the internal combustion engine;
    detecting light emerging from the illuminated combustion chamber by placing a detector inside of an intake port or an exhaust port on a side that is adjacent to the stem of the valve and that is averted from the combustion chamber, for ascertainment; and
    determining the valve position of the valve for ascertainment by way of the detected light.

2. A method for ascertaining a respective valve position of at least two valves of an internal combustion engine having a multiplicity of valves, each valve having a head and a stem, the method comprising the acts of:
    illuminating a combustion chamber of the internal combustion engine;
    detecting light emerging from the illuminated combustion chamber by placing a detector inside of an intake port or an exhaust port on a side that is adjacent to the stem of the valve and that is averted from the combustion chamber, for ascertainment; and
    determining the respective valve position of the at least two valves for ascertainment on the basis of the light detected in each case.

3. The method as claimed in claim 1, wherein the step of detecting the emerging light is performed continuously or discontinuously.

4. The method as claimed in claim 3, wherein the step of detecting the emerging light comprises a detection of a change in a light intensity and/or an obstruction of the light emerging from the combustion chamber.

5. The method as claimed in claim 4, further comprising detecting a crank angle of a crankshaft of the internal combustion engine.

6. The method as claimed in claim 5, wherein the internal combustion engine is driven with cranking action by way of a separate drive.

7. A device for ascertaining a valve position of at least one valve of an internal combustion engine, each valve having a head and a stem, having a combustion chamber of the internal combustion engine, comprising:
    a light source; and
    at least one light sensor configured to detect the light of the light source, wherein the light source is designed to illuminate the combustion chamber, and the at least one light sensor is placed inside of an intake port or an exhaust port and is configured to detect the light emerging from the illuminated combustion chamber on a side that is adjacent to the stem of the at least one valve and that is averted from the combustion chamber.

8. The device as claimed in claim 7, wherein the at least one light sensor is arranged on that side of the at least one valve which is averted from the combustion chamber, in particular in an inlet or outlet duct assigned to the at least one valve.

9. The device as claimed in claim 7, wherein the arrangement comprises a plurality of light sensors, wherein each light sensor is assigned to a respective arm of a split inlet or outlet duct.

10. The device as claimed in claim 9, wherein the arrangement comprises a cranking drive for driving the internal combustion engine with cranking action.

11. The method as claimed in claim 2, wherein the step of detecting the emerging light is performed continuously or discontinuously.

12. The device as claimed in claim 8, wherein the arrangement comprises a plurality of light sensors, wherein each light sensor is assigned to a respective arm of a split inlet or outlet duct.

13. The method according to claim 1, wherein the light emerging from the illuminated combustion chamber is detected at either the intake port or the exhaust port, of a cylinder head.

14. The method according to claim 2, wherein the light emerging from the illuminated combustion chamber is detected at either the intake port or the exhaust port, of a cylinder head.

15. The device according to claim 7, wherein at least one light sensor is positioned at either the intake port or the exhaust port, of a cylinder head.

* * * * *